(12) United States Patent
Gupta et al.

(10) Patent No.: US 11,120,268 B2
(45) Date of Patent: Sep. 14, 2021

(54) AUTOMATICALLY EVALUATING CAPTION QUALITY OF RICH MEDIA USING CONTEXT LEARNING

(71) Applicant: Microsoft Technology Licensing, LLC, Redmond, WA (US)

(72) Inventors: Vipin Gupta, Bengaluru (IN); Subhash Chandra Bose Gali, Bengaluru (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 188 days.

(21) Appl. No.: 16/556,696

(22) Filed: Aug. 30, 2019

(65) Prior Publication Data

US 2021/0064879 A1     Mar. 4, 2021

(51) Int. Cl.
    *G06K 9/00* (2006.01)
    *G06K 9/62* (2006.01)
    *G06K 9/46* (2006.01)
    *G06F 40/289* (2020.01)

(52) U.S. Cl.
    CPC ....... *G06K 9/00684* (2013.01); *G06F 40/289* (2020.01); *G06K 9/46* (2013.01); *G06K 9/6256* (2013.01); *G06K 2209/01* (2013.01)

(58) Field of Classification Search
    CPC .... G06K 9/00684; G06K 9/46; G06K 9/6256; G06K 2209/01; G06F 40/289
    See application file for complete search history.

(56) References Cited

U.S. PATENT DOCUMENTS

| | | | |
|---|---|---|---|
| 2015/0169999 A1* | 6/2015 | Duerig | G06K 9/52 382/159 |
| 2018/0329892 A1* | 11/2018 | Lubbers | G06K 9/6262 |
| 2020/0285951 A1* | 9/2020 | Kim | G06K 9/6259 |
| 2020/0349395 A1* | 11/2020 | Nushi | G06K 9/6257 |
| 2021/0042579 A1* | 2/2021 | Chen | G06K 9/6234 |

OTHER PUBLICATIONS

"Computer Vision", Retrieved From: https://azure.microsoft.com/en-US/services/cognitive-services/computer-vision/, Retrieved On: Jun. 22, 2021, 16 Pages.

(Continued)

*Primary Examiner* — Atiba O Fitzpatrick
(74) *Attorney, Agent, or Firm* — Hickman Becker Bingham Ledesma LLP (57) ABSTRACT

Technologies for evaluating, scoring, and determining whether to present a caption of an image are provided. The disclosed techniques include receiving an image with associated metadata. Contextual data is identified from the image and the metadata. A generated caption for the image is received from an image caption generator. A first vector representation is generated based on the contextual image data and a second vector representation is generated based on the generated caption. A machine learned model generates a score for the generated caption using the first vector representation and the second vector representation. The score represents a confidence value defining how accurately the caption describes the image. Based on the score, the caption may be presented along with the image on a client device.

20 Claims, 5 Drawing Sheets

(56) References Cited

OTHER PUBLICATIONS

"NeuralTalk Sentence Generation Results", Retrieved From: https://cs.stanford.edu/people/karpathy/deepimagesent/generationdemo/, Retrieved On: Jun. 22, 2021, 9 Pages.

Gandrabur, et al., "Confidence Estimation for Translation Prediction", In Proceedings of the Seventh Conference on Natural Language Learning at HLT-NAACL, vol. 4, May 31, 2003, pp. 95-102.

Hossain, et al., "A Comprehensive Survey of Deep Learning for Image Captioning", In Repository of arXiv:1810 04020v2, Oct. 14, 2018, 36 Pages.

Mor, et al., "Confidence Prediction for Lexicon-Free OCR", In Proceedings of Winter Conference on Applications of Computer Vision, Mar. 12, 2018, pp. 218-225.

Specia, et al., "Estimating the Sentence-Level Quality of Machine Translation Systems", In Proceedings of 13th Conference of the European Association for Machine Translation, May 14, 2009, pp. 28-35.

Vinyals, et al., "A Picture is Worth a Thousand (Coherent) Words: Building a Natural Description of Images", Retrieved From: https://ai.googleblog.com/2014/11/a-picture-is-worth-thousand-coherent.html, Nov. 17, 2014, 3 Pages.

* cited by examiner

AUTOMATICALLY EVALUATING CAPTION QUALITY OF RICH MEDIA USING CONTEXT LEARNING

TECHNICAL FIELD

The present disclosure relates to evaluating a generated caption of an image and, more specifically, determining a caption confidence score for the generated caption of the image using contextual data.

BACKGROUND

Image captioning provides textual information about non-text content, such as images, that appear on websites, content feeds, and other content presentation platforms. Textual information may be presented auditorily or visually as an aid or substitute for presented images. For example, visually impaired users may be presented with audio captions that describe images on a website or content feed. In another example, users in areas where internet connection speed is slow may be presented with a text captions as substitutes for images in websites and/or content feeds. Thus, presenting captions of images, in either a textual or audio format, allows users, who otherwise may not be able to view the images, to consume content that includes information describing the images.

Conventional image caption generators may analyze image content to determine appropriate caption text based upon the image content. However, conventional image caption generators often misidentify objects within images, which misidentification leads to inaccurate caption content. Inaccurate caption content often misleads users as to what the image represents. For instance, a person's gender may be incorrectly identified as well as objects surrounding the person. As a result, generated image captions may not be a reliable substitute for image content when necessary.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As disclosed herein, presenting caption content for images is improved by adding technology that implements a particular approach of analyzing context data associated with an image and comparing the context data to generated caption content to determine the accuracy of the generated caption content. One particular approach involves receiving an image with associated metadata. Contextual image data associated with the image may be identified based on the image and the associated metadata, where the contextual image data may include, but is not limited to, image metadata, objects within the image, associated image categorizations, associated hashtags for the image, and identified text within the image using optical image recognition (OCR). A generated caption for the image may be received from an external caption generator. A first vector representation may be generated based on the contextual image data and a second vector representation may be generated based on the generated caption.

A machine-learned model may generate a score for the generated caption using the first vector representation and the second vector representation. The score represents a confidence value defining how well the generated caption describes the image. Based on the score of the generated caption, the caption may be presented along with the image on a client device. For instance, if the score for the caption is above a caption-quality threshold, then the caption may be presented on the client device where the client device would otherwise not display the image, such as for visually-impaired users or on client devices with poor internet connection bandwidth.

In an embodiment, the machine learned model may generate a set of scores for a set of multiple captions for a given image. The set of multiple captions may come from multiple different image caption generators that implement different image caption generation techniques. The set of scores may then be evaluated and the caption with the highest score may be selected for association with the image. Based on the selected caption and the corresponding score, the selected caption may be presented with the image on the client device.

The disclosed approaches provide advantages over conventional solutions by improving the quality of captions associated with images by evaluating each caption against context data of the image in order to determine whether the caption is appropriate for the image. This improves the quality of captions generated by image caption generators by performing a post-generation evaluation step that incorporates contextual image data, without the need to retrain or reconfigure each image caption generator. Additionally, manually provided captions may also be automatically evaluated for appropriateness and inappropriate image captions provided by users may be discarded. The disclosed approaches also provide greater efficiency and accuracy by evaluating automatically-generated captions from multiple different sources and selecting the most appropriate caption without the need to retrain and reconfigure each image caption generator implemented. The provided system evaluates generated captions, independent of their source, without the need to reconfigure or scale the current system, thereby reducing the processing time and resources needed to configure and train new image caption generators each time a new image caption generator is introduced.

System Overview

Figure 1:
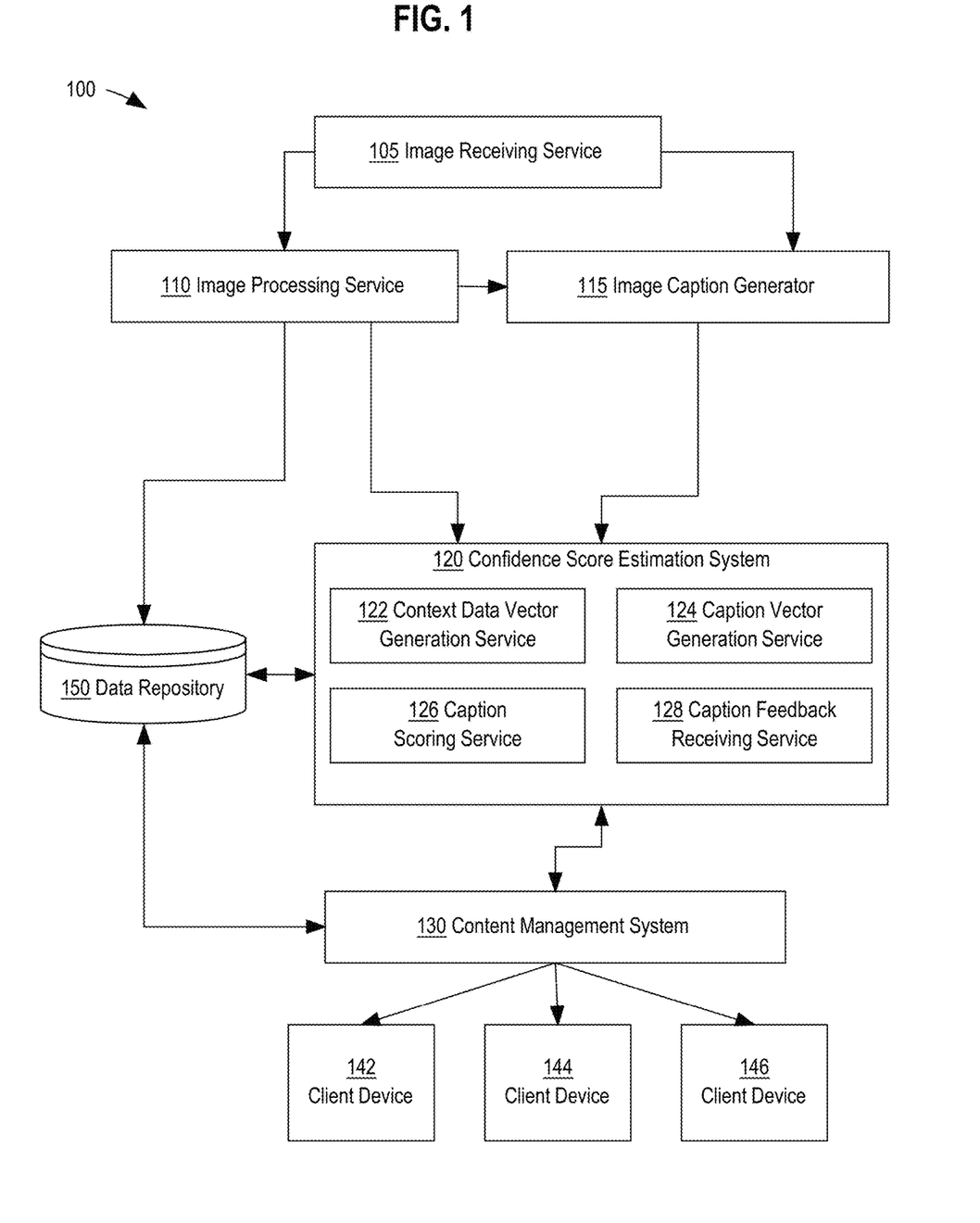
FIG. 1 is a block diagram that depicts system for evaluating and scoring generated captions of images to determine whether to present the generated captions for corresponding images, in an embodiment.

FIG. 1 is a block diagram that depicts system 100 for evaluating and scoring generated captions of images to determine whether to present the generated captions for corresponding images. System 100 includes an image receiving service 105, an image processing service 110, an image caption generator 115, a confidence score estimation system 120, a content management system 130, client devices 142-146, and a data repository 150.

In an embodiment, the image receiving service 105 may receive images and any associated image information related to the image from end-users who may upload one or more images from content providers, such as advertisers who upload advertising images or other promotional content. For example, a user may post an image using a client device, such as a computer or mobile phone, and the posted image may be received by the image receiving service 105.

In an embodiment, associated image information may represent any associated image metadata, such as associated hashtags, image categories provided by the user or the sending server, manually generated captions provided by the user, associated image comments, image author information, and user information associated with the posting user, such as the user's profile page. Specifically, user information may include information from the user's profile page such as the user's residence, occupation, interests, affiliated groups, and/or browsing history. The user information may be used to provide additional context to the image posted by the user. For instance, if the user posted an image of a skier and the user's profile page indicates that the user is a ski instructor, then the user information may be relevant to evaluating the quality of a generated caption related to skiers or skiing.

In an embodiment, the image processing service 110 may receive, from the image receiving service 105, images and their associated image information for pre-processing. Image pre-processing may represent extracting image information, such as identifying objects within an image, categorizing the image, recognizing text within the image, recognizing logos within the image, and processing any other metadata associated with the image. For example, the image processing service 110 may implement OCR techniques to identify features, such as lines, shapes, and other marks, within the image, that may represent text characters that make up words.

In an embodiment, the image processing service 110 may implement a machine learning model, such as a convolutional neural network (CNN), to identify specific objects within the image. A neural network is a machine learning technique that utilizes a network of learning units, also referred to as neural nodes. The neural nodes are trained to convert an input, such as an image, into corresponding output signals, such as a feature measurement. In a convolutional neural network, the neural nodes are arranged in a plurality of layers. Each node receives input from one or more nodes in layers below it and passes data to one or more nodes in layers above it. Each neural node may be associated with a weight that is applied to the data it receives to generate output to pass to a subsequent neural node. Each neural node may also be associated with a threshold value, wherein output is passed to one or more subsequent nodes if the threshold value is met. Examples of CNN architectures that may be implemented include, but are not limited to, Inception-V3, Inception-Resnet, and Inception-v4. CNN and the described architectures are representative examples of implemented machine learning models. Implementation of a machine learning model by the image processing service 110 is not limited to CNN architectures, several other machine learning models may be implemented by the image processing service 110 to identify specific objects within the image.

Examples of objects that may be identified include, but are not limited to, persons, such as male, female, adult, or child, stationary objects, such as buildings, signs, bridges, or any other stationary object, moving objects, such as cars, trucks, planes, or trains, specific products, such as a Prada purse, and any other identified objects within the image. Additionally, the image processing service 110 may implement an image categorizer that uses conventional machine-learned techniques to categorize the image into one or more categories. For instance, an image depicting nature may be categorized as an outdoor landscape image, or an image depicting people walking in a city center may be categorized as an urban landscape image.

In an embodiment, the image processing service 110 may implement logo recognition techniques to identify one or more logos within the image. Logos may be useful when generating a caption as the logos may help describe what the image is about. For example, an image showing a person running with a Nike "swoosh" logo below the runner may be used to describe the image as a Nike advertisement of a runner.

In an embodiment, the image caption generator 115 may represent a caption generation service that inputs an image and associated image metadata to generate a corresponding image caption. The image caption generator 115 may represent any conventional caption generation service that implements machine learning technologies to analyze an image and its associated image information and generate a natural language description of the image. For example, the image caption generator 115 may implement a CNN model for generating an image caption. In another example, the image caption generator 115 may implement a combination of a CNN model and a sequence-to-sequence recurrent neural network (RNN) model for generating an image caption. An RNN is a class of neural networks where connections between nodes form a directed graph along a temporal sequence. The image caption generator 115 is not limited to a single caption generator and may implement several different types of image caption models for generating an image caption.

In an embodiment, the image processing service 110 may send the image and associated image metadata to the image caption generator 115 to automatically generate an image caption. In another embodiment, if the user has provided a user-caption, then the image caption generator 115 may receive, from the image receiving service 105, the user-caption and format the user-caption into a preferred caption format. For example, if the user-caption includes misspelled words or other grammatical errors, then the image caption generator 115 may correct the spelling and/or grammatical errors to generate the caption for the image. In yet another embodiment, the image caption generator 115 may generate multiple captions for the image using one or more caption generation services, conventional or proprietary, as well as generating the formatted user-caption.

In an embodiment, the content management system 130 manages user sessions and provides users with content within websites, user feeds, notifications and other forms for consuming content. The content management system 130 allows users to consume, upload, search for, approve of (e.g. "like"), dislike, and/or comment on content, such as images. Although depicted in a single element, the content management system 130 may comprise multiple computing elements and devices, connected in a local network or distributed regionally or globally across many networks, such as the Internet. The content management system 130 may comprise multiple computing elements, including file servers and database systems. For example, content management system 130 may include a content provider interface that allows content providers to create and manage their respective content delivery campaigns and a content delivery exchange that conducts content item selection events in response to content requests from a third-party content delivery exchange and/or from publisher systems. The content management system 130 provides content, such as images and captions for images, to client devices 142-146 in response to requests initiated by users of client devices 142-146.

A content request from a client device may be in the form of a HTTP request that includes a Uniform Resource Locator (URL) and may be issued from a web browser or a software application that is configured to communicate with content management system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, the content management system 130 retrieves the content from the data repository 150 and provides the requested content (e.g., a web page) to the client device.

Examples of client devices 142-146 include desktop computers, laptop computers, tablet computers, wearable devices, video game consoles, and smartphones.

In an embodiment, the data repository 150 may represent a data storage repository storing images, image context data, user profile information, user feedback data related to images and their corresponding captions, image-and-caption combination training data, and any other data related to stored images and associated captions. For example, the data repository 150 may store an image, one or more corresponding captions for the image, context data related to the image, any user profile information of the user that uploaded the image, and any received feedback information related to the image and the one or more captions.

Confidence Score Estimation System

In an embodiment, the confidence score estimation system 120 scores generated captions for images and determines whether to present the generated captions to client devices of users. The confidence score estimation system 120 may comprise one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to score captions and select one or more captions for presentation based upon their calculated score. In an embodiment, the confidence score estimation system 120 includes a context data vector generation service 122, a caption vector generation service 124, a caption scoring service 126, and a caption feedback receiving service 128.

Context Vector Generation Service

In an embodiment, the context data vector generation service 122 may generate a first vector representation based upon the context data identified by the image processing service 110. The first vector representation may be a concatenation of multiple feature vectors that each represent different features from the context data. In an embodiment, the context data vector generation service 122 receives the context data identified by the image processing service 110 and generates feature vectors for each type of feature within the context data. For example, if the context data includes information describing identified objects in the image, then the context data vector generation service 122 may generate object vectors for the identified objects, represented as $[V_1, V_2 \ldots V_N]$, where N equals the number of objects. In other examples, features may be represented using more or less vectors and different vector spaces. If the context data includes OCR identified text, then the context data vector generation service 122 may generate an OCR text vector represented as $[T_1, T_2 \ldots T_M]$, where M equals the number of dimensions within the OCR text vector space. The context data vector generation service 122 may generate feature vectors for each of the features in the context data including, but not limited to, image objects, OCR text, image categorization, identified logos, user profile information, hashtags, and any other available features from the context data.

In an embodiment, the context data vector generation service 122 generates a single concatenated feature vector from each of the individual feature vectors. For example, the object vector, represented as $[V_1, V_2 \ldots V_N]$, and the OCR text vector, represented as $[T_1, T_2 \ldots T_M]$, may be concatenated to generate the first vector as $[V_1, V_2, \ldots V_N, T_1, T_2 \ldots T_M]$, where the object vector values map to the object vector space and the OCR text vector values map to the text vector space. In an embodiment, if there is no data for a specific feature, such as no OCR text was identified, then the OCR text vector may be represented with zero values. The zero-value OCR text vector is still concatenated to the other feature vectors to form the concatenated feature vector. The concatenated feature vector is not limited to containing only an object vector and an OCR text vector. The concatenated feature vector may be a concatenation of each feature vector generated from the context data. For instance, the concatenated feature vector may include feature vectors for image objects, OCR text, image categorization, identified logos, user profile information, hashtags, and any other available features from the context data.

Caption Vector Generation Service

In an embodiment, the caption vector generation service 124 receives the generated caption from the image caption generator 115 and generates a text vector that comprises numerical values for the caption text. A text vector may represent a word, set of words, or a string of characters that make up the generated caption. The text vector may be a vector within a specific vector space where vectors representing similar words or phrases may be located close to each other within the vector space and vectors representing dissimilar words or phrases may be located far from each other within the vector space.

In an embodiment, the caption vector generation service 124 may implement a machine learning model to generate text vectors within a text vector space that contains multiple dimensions. The text vector space may be defined as a space comprising text vectors. Within the text vector space, each unique string of text, such as a set of words or a phrase, may be assigned a corresponding vector within the text vector space. Text vectors are positioned, within the text vector space, such that words that share common contexts are located close in proximity to one another. Examples of the machine learning model implemented by the text vector generation service 120 may include commercially available model such as Word2vec and Glove. Word2vec is a commercially available deep learning model that implements word embedding configured to generate vector representations of words that capture the context of the word, semantic and syntactics properties of the word, and relations to other words.

Glove is a commercially available unsupervised learning algorithm configured to generate vector representations of words. Glove may be trained using aggregated word-to-word co-occurrence statistics from a corpus to generate a model that contains linear substructures of a word vector space. For example, the word vector space may include vectors for words such as king, queen, and prince, that are close in proximity based upon the relation between words that describe royal titles. Other examples of vectors that are close in proximity may include closely related words such as frog, toad, lizard, and any other words representing species related to a frog.

In an embodiment, the machine learning model implemented by the caption vector generation service 124 may be trained using a text corpus. A text corpus may represent a structured set of text for which statistical analysis for word-to-word co-occurrences may be performed. The inputted text corpus may be analyzed by the machine learning model to determine co-occurrence statistics. Once trained, the machine learning model may receive input text characters, such as a string of words, and may output a multi-dimension text vector of values representing each of the words identified within the inputted text characters.

Caption Scoring Service

In an embodiment, the caption scoring service 126 may implement a machine learned model that generates a score for a caption based upon the concatenated feature vector, from the context data vector generation service 122, and the text vector from the caption vector generation service 124. In an embodiment, the caption scoring service 126 may implement a gradient boosted tree classifier machine learned model. Gradient boosted tree classification is a machine learning technique for regression and classification problems that produces a prediction model comprised of an ensemble of weak decision trees. The machine learned model is built in stages and generalizes the stages by allowing optimization of an arbitrary differentiable loss function. In other embodiments, the caption scoring service 126 may implement other types of available machine learned models. Input for the machine learned model is the concatenated feature vector and the text vector. Output of the machine learned model is a confidence score for the generated caption. The confidence score may be a numerical score between 0 and 1. In other embodiments, the confidence score may be scaled using any defined scale, such as 0-100, 0-1000, or and other defined scale.

The caption scoring service 126, upon generating a score for a given caption, may evaluate whether the caption should be associated with the given image for presentation on client devices. In an embodiment, the caption scoring service 126 may classify the scored caption, based on the generated score into a quality category, such as "GOOD", "OK", or "BAD". The GOOD category may represent a caption that has a score above a first quality threshold that represents captions that are fully informative and accurately describe the corresponding image. Captions categorized in the GOOD category may be associated with the given image and may be presented with the image as an alternative to viewing the image, such as alternative text or spoken text for the hearing impaired. In an embodiment, captions that are categorized in the GOOD category may be stored within the data repository 150 along with the image. Caption and image pairs that are in the GOOD category may also be labeled as a positive training sample in future machine learned model training data.

The OK category may represent a caption that has a score that is below the first quality threshold, but above a second quality threshold. The second quality threshold may represent captions that are partially informative and describe at least some of the corresponding image. Captions categorized in the OK category may be associated with the given image but may be sent to a quality control (QA) engineer for further review. QA engineers may review the given image and the corresponding caption to check for correctness and accuracy. If the QA engineer determines that the caption is accurate, then the image and the associated caption may be stored in the data repository 150 and may be used for presentation with the image on client devices. If however, the QA engineer determines that the caption is inaccurate, then the caption may be manually corrected by the QA engineer. The corrected caption and the image may be stored in the data repository 150 and may be used for presentation with the image on client devices.

In an embodiment, the OK category may contain two or more sub-categories. For example, the OK category may contain an "OK INCOMPLETE" category and an "OK INCORRECT" category. The OK INCOMPLETE category may represent a caption that is partially informative and has no misleading information. For instance, if the image is of a woman holding a mobile phone and the caption states "a person holding a mobile phone", then the image is partially informative and contains no misleading information because the person is holding their mobile phone. However, the caption is still partially informative because the gender of the person (a woman) has not been identified. The OK INCORRECT category may represent a caption that is partially informative but has some wrong information. Using the previous example of the woman holding a mobile phone, the OK INCORRECT caption may state "woman holding a remote control". This caption is partially informative because it identifies the woman but contains some wrong information as the woman is holding a mobile phone, not a remote control. Caption and image pairs that are categorized in the OK INCOMPLETE category may be labeled as a positive training sample in future machine learned model training data after manual review and/or correction by a QA engineer. Caption and image pairs that are categorized in the OK INCORRECT category may be labeled as a negative training sample in future machine learned model training data.

The BAD category may represent a caption that has an assigned score that is below the first and second quality thresholds. Captions that fall under the BAD category are wrong and/or misleading. For example, captions that incorrectly identify gender, objects, persons, screenshots, and any other feature of the image may be considered inappropriate as these captions may mislead a user as to what the image is really about. Caption and image pairs that fall into the BAD category may be disassociated. In an embodiment, captions in the BAD category may still be stored within the data repository for machine learned model training purposes. For example, BAD caption-image pairs may be labeled as a negative training sample in future machine learned model training data.

Machine Learned Model Training

In an embodiment, the machine learned model is trained using human-labeled data of a set of images. For example, a set of several thousand pre-labeled images that have been either captioned by a human or have been automatically captioned and reviewed by a human are used along with their associated concatenated feature vectors and text vectors to train the machine learned model. In an embodiment, the machine learned model may be retrained using previously categorized caption-image pairs, as discussed above. Additionally, training data may be generated from direct user feedback. For example, if a caption and image pair has been manually edited by an end-user, then the caption and image pair may be marked as a negative training sample if the number of edits to the caption indicates that the caption was inaccurate or incorrect. Additionally, caption-image pairs that receive positive feedback, such as likes or comments that indicate the accuracy of the caption, may be used to reinforce that the caption-image pair should be used as a positive training sample.

Caption Feedback Receiving Service

In an embodiment, the caption feedback receiving service 128 may receive feedback from users and/or QA engineers evaluating generated captions for images. For example, when a QA engineer provides positive feedback for a caption and image pair, such as affirming the caption content, the caption feedback service 128 may update the score of the caption and image pair within the data repository 150 to reflect the positive feedback. Received positive feedback may be used to update the score of the caption and/or update the category associated with the pair from an OK category to a GOOD category. Conversely, if the caption feedback service 128 receives negative feedback from a QA engineer for the caption and image pair, such as the QA engineer edits the caption, the caption feedback service 128 may update the score of the original caption and image pair within the data repository 150 and/or update the assigned category from an OK category to a BAD category for the original pair. The edited caption and image pair may be stored in the data repository 150 for future presentation use but, the original pair may be used as a negative training sample in training data.

In an embodiment, the caption feedback service 128 may receive feedback from client devices 142-146, via the content management system 130. For example, user interactions, such as likes or comments that indicate an affirmation of the caption or dissatisfaction with a caption may be captured by the content management system 130 and may be sent to the caption feedback service 128. The caption feedback service 128 may track user feedback for each of the caption and image pairs. If there is a certain number of either positive or negative feedback for a given pair, then the caption feedback service 128 may update the score or assigned category of the corresponding pair.

In an embodiment, the caption feedback service 128 may also update the threshold values for the first and second thresholds. The first threshold, representing the threshold for a GOOD caption and image pair, and the second threshold, representing the threshold for an OK caption and image pair, may be originally determined based upon training data and historical caption and image pair data. The caption feedback service 128 may dynamically update the threshold values for the first and second threshold based upon received feedback from QA engineers and end-users. For example, if a large number of caption and image pairs categorized as OK are affirmed as accurate captions by the QA engineers, then the caption feedback service 128 may lower the first threshold such that more caption and image pairs are labeled as GOOD instead of being labeled as OK. Conversely, if a large number of caption and image pairs categorized as OK are being edited to correct inaccuracies in the captions by the QA engineers, then the caption feedback service 128 may raise the second threshold such that more caption and image pairs are labeled as BAD instead of being labeled into the OK category.

In an embodiment, if the caption feedback service 128 determines that the first and second thresholds have changed a certain number of times of a period, then the caption feedback service 128 may trigger a retraining of the machine learned model. This may occur if the original training data does not accurately reflect a sample of the current set of images, thus producing an inaccurate model. The machine learned model may then be retrained using labeled caption and image pairs from the data repository 150.

Processing Overview

Figure 2:
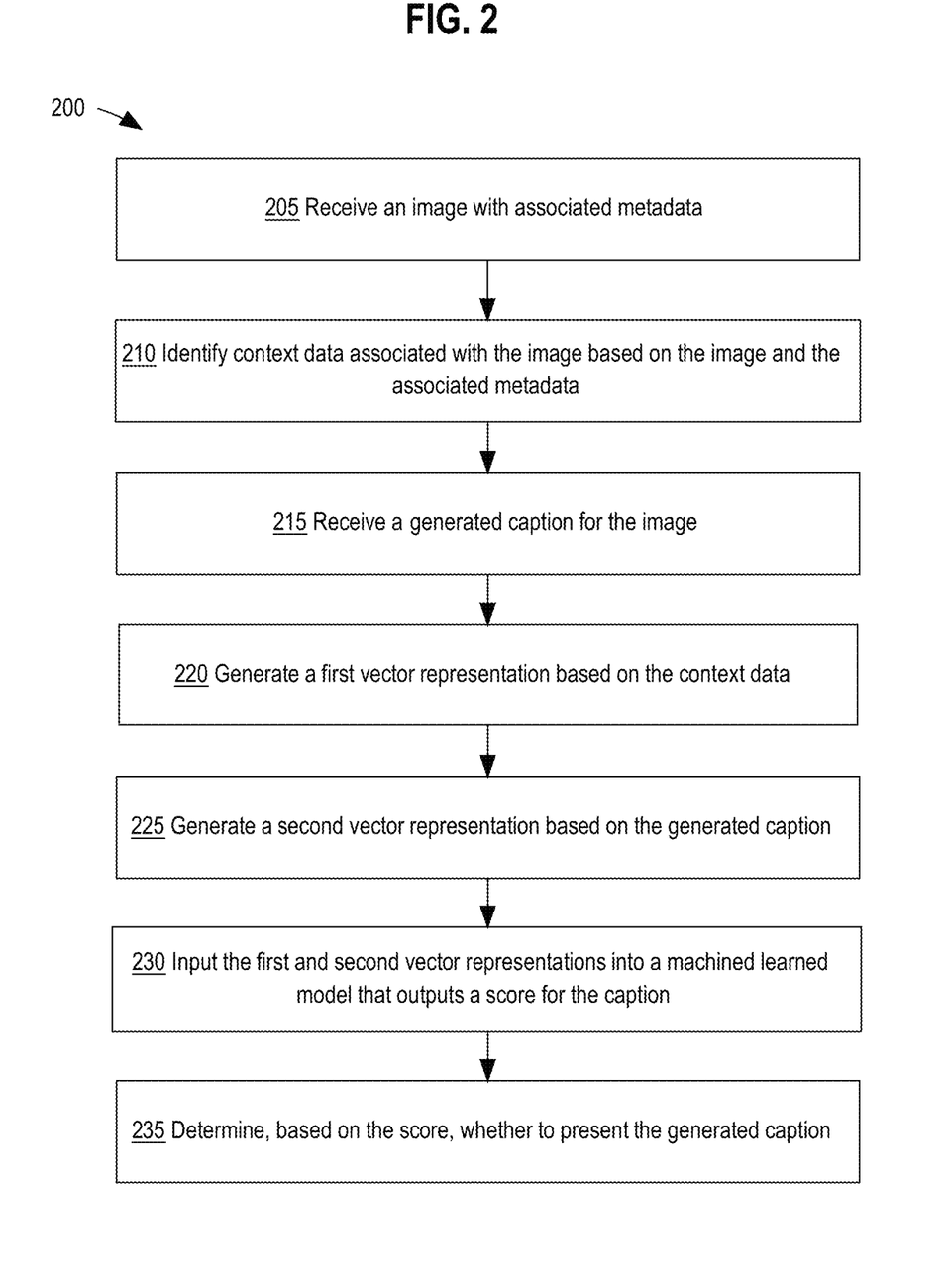
FIG. 2 depicts an example flowchart for scoring a caption for an image and determining whether to present the caption with the image, in an embodiment.

FIG. 2 depicts an example flowchart for scoring a caption for an image and determining whether to present the caption with the image. Process 200 may be performed by a single program or multiple programs. The operations of the process as shown in FIG. 2 may be implemented using processor-executable instructions that are stored in computer memory. For purposes of providing a clear example, the operations of FIG. 2 are described as performed by components described in system 100. For the purposes of clarity process 200 is described in terms of a single entity. In an embodiment, the image receiving service 105, the image processing service 110, and the confidence score estimation system 120 may perform operations of process 200 on one or more images.

In operation 205, process 200 receives an image with associated metadata. In an embodiment, the image receiving service 105 may receive an image for captioning and scoring from a user from client device 142, an internal or external server, or any other computing device. The image may include associated metadata that includes, but is not limited to, associated hashtags, an image category provided by the user or the sending server, associated comments, image author information, geo-location data about when the user posted the image and/or where the image was captured, and user information associated with the posting user, and any other image metadata. The image file may be received via a direct upload to a specified network folder or website, from an email that was sent to a specific email account associated with the image receiving service 105, or from a network location associated with a network storage service, such as Box, Google Drive, Drop Box, or any other network storage service.

In operation 210, process 200 identifies context data associated with the image based on the image and the associated metadata. In an embodiment, the image processing service 110 may identify context data associated with the received image by analyzing the pixels that make up the image to identify objects, logo, and/or known products within the image and to identify the one or more text characters from the image. For instance, the image processing service 110 may implement OCR techniques to identify features, such as lines, shapes, and other marks, within the image that may represent text characters that make up words. In an embodiment, the image processing service 110 may analyze the associated metadata to identify hashtags, image categories, comments about the image, image author information, and posting user profile information. For example, attributes of the posting user's profile may be analyzed, such as residence, occupation, education, interests, and any other information relevant to the posted image, to identify contextual image data.

In operation 215, process 200 receives a generated caption from the image. In an embodiment, the confidence score estimation system 120 may receive a generated caption from the image caption generator 115. The image caption generator 115 may represent any number of internal or external automated caption generators. The image caption generator 115 may generate and send a caption to the confidence score estimation system 120, where the generated caption is based upon the received image and any associated image metadata. For example, the image caption generator 115 may implement a CNN model to analyze the pixels within the image and generate feature embeddings, such as feature vectors, which may then be used by a sequence modeler, such as a Recurrent Neural Network (RNN), to generate a caption that represents the image using the feature embeddings. In another embodiment, the posting user may have provided a manually-generated caption for the image. The image caption generator 115 may receive the manually generated image and forward the manually-generated image to the confidence score estimation system 120. In yet another embodiment, the image caption generator 115 may implement multiple caption generation techniques and may generate a set of two or more captions for the image, which may also include a manually-generated caption. The confidence score estimation system 120 may receive a set of multiple captions for a single image.

In operation 220, process 200 generates a first vector representation based on the context data. In an embodiment, the context data vector generation service 122 may receive context data from the image processing service 110 and generate the first vector representation. The context data vector generation service 122 may first generate feature vectors for each of the features in the context data. For example, if the context data includes identified objects, an image classification, OCR text, and hashtags for the image, then the context data vector generation service 122 may generate an object vector, an image classification vector, an OCR text vector, and hashtag vectors. The context data vector generation service 122 may concatenate the generated feature vectors to generate a concatenated feature vector, which represents the first feature vector.

In operation 225, process 200 generates a second vector representation based on the generated caption. In an embodiment, the caption vector generation service 124 receives the generated caption from the image caption generator 115 and generates a text vector that comprises numerical values for the caption text. The caption vector generation service 124 may implement a machine learning model to generate the text vector that represents a numerical representation of sets of characters within the generated caption.

In operation 230, process 200 inputs the first and second vector representations into a machine learned model that outputs a score for the caption. In an embodiment, the caption scoring service 126 implements the machine learned model that generates a confidence score based upon the concatenated feature vector, from the context data vector generation service 122, and the text vector from the image caption generator 115. The machine learned model may implement a gradient boosted tree classification to determine the confidence score for the generated caption with respect to the context data for the image.

In operation 235, process 200 determines, based on the score, whether to present the generated caption. In an embodiment, the caption scoring service 126 may categorize the generated caption based upon the calculated score for the caption. If the caption is above a first quality threshold, then the caption and image pair may be assigned to the GOOD category, which allows the caption to be presented with the image on client devices 142-146. For example, if the calculated score equals 0.85 and the first quality threshold is set to 0.80, where the score is scaled between 0 and 1.0, then the caption and image pair is assigned to the GOOD category. The caption and image pair may be stored in the data repository 150 with an assigned GOOD category label. When the content management system 130 receives a request for the specific image from client device 142, the content management system 130 may retrieve both the caption and image pair for presentation on the client device 142 based upon the GOOD category label.

In another example, if the calculated score equals 0.75 and the first quality threshold is set to 0.80 and the second quality threshold is set to 0.50, then the caption and image pair is assigned to the OK category. The caption and image pair may be stored in the data repository 150 with an assigned OK category label. The confidence score estimation system 120 may then send a request to a QA engineer to manually review the caption and image pair for correctness and accuracy. If the QA engineer determines that the caption is an accurate representation of the image, then the caption and image pair may be made available for presentation to users. When the content management system 130 receives a request for the specific image from client device 142, the content management system 130 may retrieve both the caption and image pair for presentation on the client device 142 based upon the OK category label and the approval from the QA engineer. If, however, the QA engineer does not approve the caption and image pair, then the QA engineer may correct the caption, thus generating an updated caption and image pair that is available for presentation, or the QA engineer may reject the caption and image pair, which would not be available for presentation.

In yet another example, if the calculated score equals 0.45 and the first quality threshold is set to 0.80 and the second quality threshold is set to 0.50, then the caption and image pair is assigned to the BAD category. The caption and image pair may be stored in the data repository 150 with an assigned BAD category label for the purposes of being used as future machine learned model training data. When the content management system 130 receives a request for the specific image from client device 142, the content management system 130 may retrieve only the image for presentation on the client device 142 because the caption and image pair is assigned to the BAD category and is inappropriate for display. In an embodiment, caption and image pairs assigned to the BAD category may not be automatically used as future machine learned model training data. For example, a subset of caption and image pairs assigned to the BAD category may be used as training data if the subset of pairs have been misclassified by the machine learned model.

Figure 3:
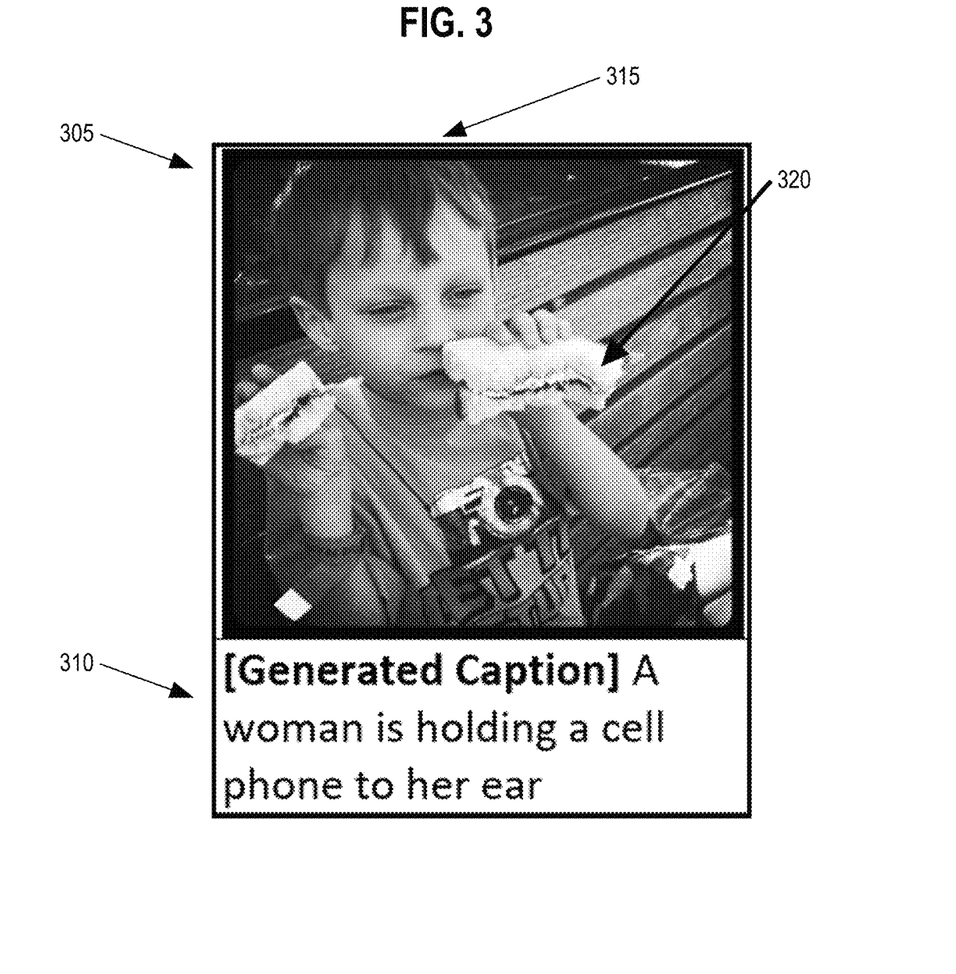
FIG. 3 depicts an example of an image that has been inappropriately captioned by an image caption generator, in an embodiment.

FIG. 3 depicts an example of an image that has been inappropriately captioned by an image caption generator. Image 305 is an image of a male child holding a sandwich to his face. Caption 310 represents the caption generated by the image caption generator 115. The caption 310 states "a woman is holding a cell phone to her ear", which is an incorrect caption for image 305. Child 315 represents the male child in the image 305, not a woman as stated in caption 310. This illustrates an incorrect labeling of the person by the image caption generator 115. Object 320 is a sandwich being held by child 315. However, image caption generator 115 identified object 320 as a cell phone, which is incorrect. Based on the inaccuracies of identifying child 315 and object 320, the image caption generator 115 generated an inappropriate caption, which resulted in a low confidence score of 0.45 provided by the caption scoring service 126.

In an embodiment, the content management system 130 may receive feedback data from client devices 142-146 related to the caption and image pair. Feedback data may be in the form of edits made to the captions by end-users or likes associated with the caption and image pair. The feedback may be sent from the content management system 130 to the caption feedback receiving service 128. The caption feedback receiving service 128 may then dynamically adjust the confidence score of the caption and image pair or adjust the category associated with the caption and image pair, such as changing the assigned category from GOOD to OK if some edits have been made by users. Alternatively, feedback may be used to dynamically adjust the first and second quality thresholds if several caption and image pairs receive either positive or negative feedback. In another example, manual edits to captions may produce new caption and image pairs that may be used as new training data samples.

Multiple Captions

In an embodiment, the confidence score estimation system 120 may evaluate multiple different captions for an image and select the most appropriate caption to be associated with the image based upon the assigned confidence scores. Referring to FIG. 2 in the context of the image caption generator 115 generating a set of multiple captions, in operation 205, the image receiving service 105 receives the image with associated metadata. The metadata may include a manually-generated caption from the posting user. In operation 210, the image processing service 110 identifies context data associated with the received image.

Figure 4:
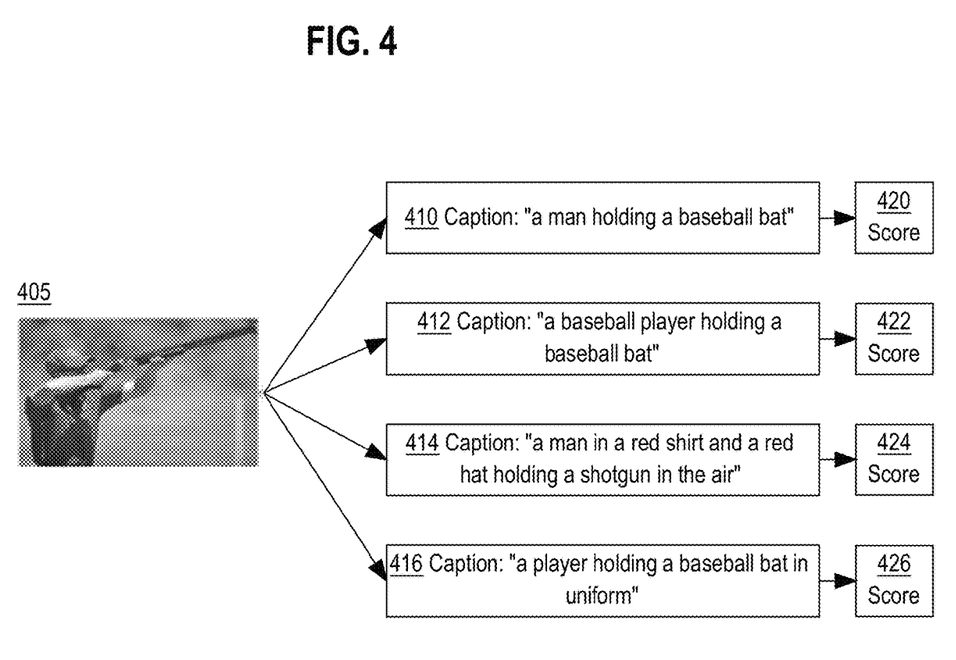
FIG. 4 depicts a confidence score generation system receiving the set of multiple captions from an image caption generator, in an embodiment.

In operation 215, the confidence score generation system 120 receives a set of multiple captions generated by the image caption generator 115. FIG. 4 depicts the confidence score generation system 120 receiving the set of multiple captions from the image caption generator 115. Image 405 represents the received image, which is an image of a man holding a shotgun in the air. Captions 410-416 represent the multiple captions in the set of multiple captions, where caption 410 represents a manually-provided caption, caption 412 is a first automatically generated caption, caption 414 is a second automatically generated caption, and caption 416 is a third automatically generated caption. Other examples may have more or less automatically generated captions and have more, less, or even no manually-provided captions.

In operation 220, the context data vector generation service 122 receives context data from the image processing service 110 and generates the first vector representation. In operation 225, the caption vector generation service 124 receives the set of multiple captions from the image caption generator 115 and generates text vectors for each of the generated captions. For example, four different text vectors are generated for captions 410-416.

In operation 230, the caption scoring service 126 generates confidence scores for each caption and image pair for captions 410-416. For example, the caption scoring service 126 may first receive as input the first vector representation for the context data and a text vector for caption 410. The caption scoring service 126 may generate score 420, which represents the confidence score for caption 410. The caption scoring service 126 may then receive as input the first vector representation for the context data and another text vector for caption 412 and generate score 422, which represents the confidence score for caption 412. The caption scoring service 126 may then receive as input the first vector representation for the context data and another text vector for caption 414 and generate score 424, which represents the confidence score for caption 414. The caption scoring service 126 may then receive as input the first vector representation for the context data and another text vector for caption 416 and generate score 426, which represents the confidence score for caption 416.

In operation 235, the caption scoring service 126 may rank each of the captions 410-416 based on their corresponding scores 420-426. The caption with the highest score may be selected and associated with the image. For example, if caption 414, which states "a man in a red shirt and a red hat holding a shotgun in the air" has the highest score 424, then the caption scoring service 126 may select caption 414 and determine whether, based on the score, to present caption 414 with image 405. If the score is categorized in the GOOD category, then caption 414 and image 405 would be store in data repository 150. The content management system 130, upon receiving a request for image 405, would retrieve image 405 and caption 414 for presentation.

In an embodiment, if multiple captions have scores above the first quality threshold, then the captions above the first quality threshold may be stored in the data repository 150 for future presentation and use as training data. If a request for the image is received by the content management system 130, then the pair with the highest score will be used. Other captions that have scores below the first quality threshold and above the second quality threshold may be sent to a QA engineer for review and correcting. Captions that have scores below both quality thresholds may be stored in the data repository 150 for the purpose of being used as training data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
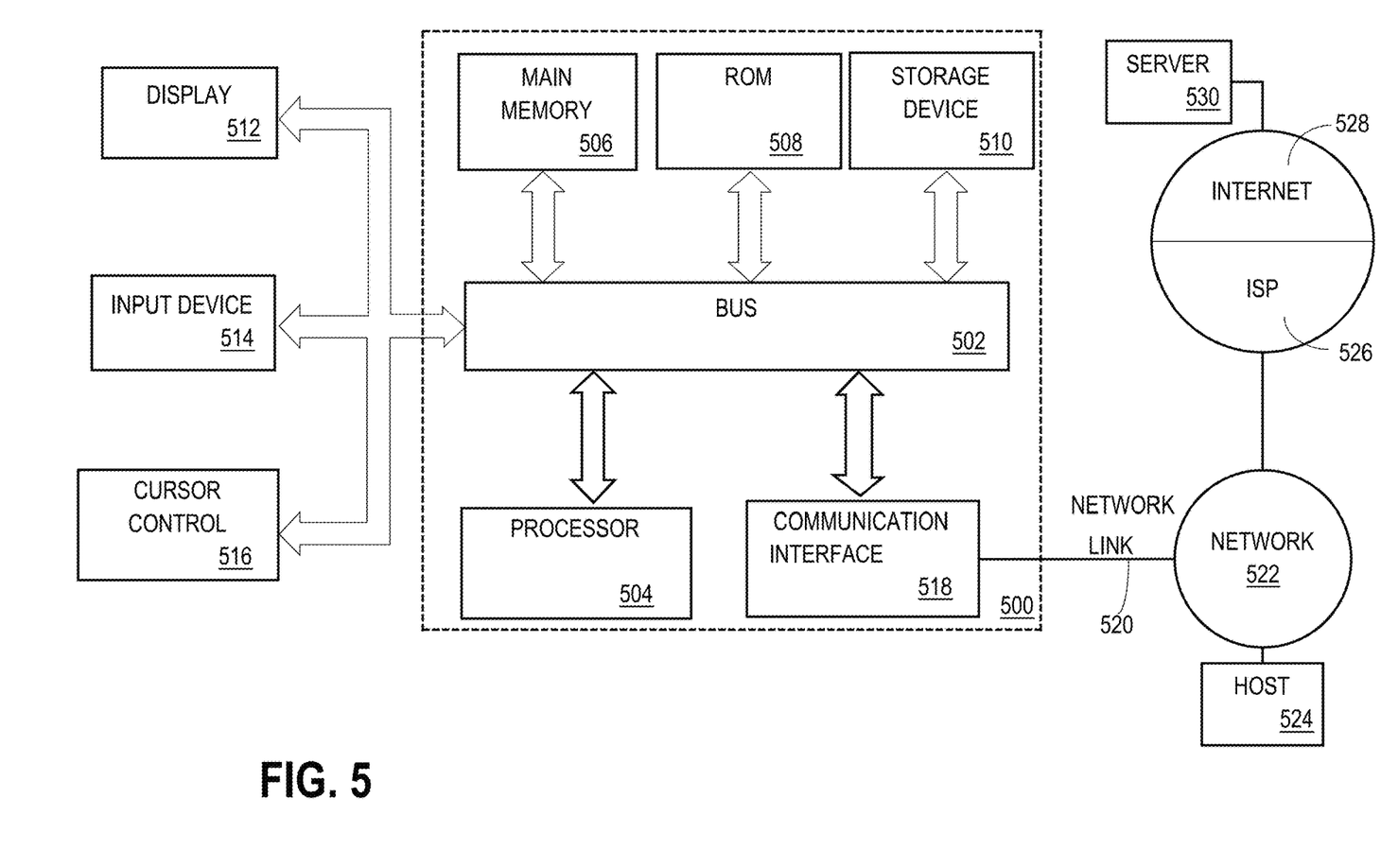
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an image with associated metadata;
   identifying context data associated with the image based on the image and the associated metadata;
   receiving a generated caption for the image;
   generating a first vector representation based on the context data;
   generating a second vector representation based on the generated caption;
   inputting the first and second vector representations into a machine-learned model that outputs a score for the generated caption;
   determining, based on the score, whether to present the generated caption;
   wherein the method is performed by one or more computing devices.

2. The method of claim 1, wherein the context data includes data objects for at least one of identified objects in the image, hashtags, associated image comments, image category, OCR text from the image, or an identified logo.

3. The method of claim 1, wherein generating the first vector representation comprises:
   generating two or more feature vectors based on different data object types within the context data; and
   generating the first vector representation by concatenating the two or more feature vectors into the first vector representation.

4. The method of claim 1, wherein the generated caption is a first candidate caption, further comprising:
   receiving a second candidate caption for the image, wherein the second candidate caption is a second generated caption;
   generating a third vector representation based on the second candidate caption;
   inputting the first and third vector representations into the machine-learned model that outputs a second score for the second candidate caption; and
   determining, based on the second score, whether to present the second candidate caption.

5. The method of claim 4, wherein the first candidate caption was generated using a first caption generation technique and the second candidate caption was generated using a second caption generation technique.

6. The method of claim 1, wherein the machine-learned model is trained using a training dataset of captioned images labeled as either appropriately captioned or inappropriately captioned based upon the score calculated by the machine-learned model.

7. The method of claim 1, further comprising:
   presenting the generated caption on a client device;
   receiving feedback, from the client device, related to the generated caption; and
   adjusting the score of the generated caption based on the feedback.

8. The method of claim 1, wherein the generated caption is an automatically generated caption generated by an image caption generator.

9. The method of claim 1, wherein the generated caption is a manually generated caption provided by a user.

10. The method of claim 1, wherein determining whether to present the generated caption comprises:
    determining whether the score is above a first quality threshold; and
    in response to determining that the score is above the first quality threshold, presenting the generated caption on a client device.

11. The method of claim 1, wherein determining whether to present the generated caption comprises:
    determining whether the score is below a first quality threshold and above a second quality threshold;
    in response to determining that the score is below the first quality threshold and above the second quality threshold, sending the generated caption and the image to a user for manual review;
    receiving, from the user, feedback indicating that the generated caption accurately describes the image; and
    in response to receiving the feedback, presenting the generated caption on a client device.

12. The method of claim 1, wherein determining whether to present the generated caption comprises:
    determining whether the score is below a particular quality threshold; and
    in response to determining that the score is below the particular quality threshold, disassociating the generated caption from the image.

13. A computer program product comprising:
    one or more non-transitory computer-readable storage media comprising instructions which, when executed by one or more processors, cause:
    receiving an image with associated metadata;
    identifying context data associated with the image based on the image and the associated metadata;
    receiving a generated caption for the image;
    generating a first vector representation based on the context data;
    generating a second vector representation based on the generated caption;
    inputting the first and second vector representations into a machine-learned model that outputs a score for the generated caption;
    determining, based on the score, whether to present the generated caption.

14. The computer program product of claim 13, wherein the context data includes data objects for at least one of identified objects in the image, hashtags, associated image comments, image category, OCR text from the image, or an identified logo.

15. The computer program product of claim 13, wherein generating the first vector representation comprises:
    generating two or more feature vectors based on different data object types within the context data; and
    generating the first vector representation by concatenating the two or more feature vectors into the first vector representation.

16. The computer program product of claim 13, wherein the generated caption is a first candidate caption, and wherein the one or more non-transitory computer-readable storage media comprises further instructions which, when executed by the one or more processors, cause:

receiving a second candidate caption for the image, wherein the second candidate caption is a second generated caption;

generating a third vector representation based on the second candidate caption;

inputting the first and third vector representations into the machine-learned model that outputs a second score for the second candidate caption; and determining, based on the second score, whether to present the second candidate caption.

17. The computer program product of claim 16, wherein the first candidate caption was generated using a first caption generation technique and the second candidate caption was generated using a second caption generation technique.

18. The computer program product of claim 13, wherein the one or more non-transitory computer-readable storage media comprises further instructions which, when executed by the one or more processors, cause:

presenting the generated caption on a client device;

receiving feedback, from the client device, related to the generated caption; and adjusting the score of the generated caption based on the feedback.

19. The computer program product of claim 13, wherein the generated caption is an automatically generated caption generated by an image caption generator.

20. The computer program product of claim 13, wherein the generated caption is a manually generated caption provided by a user.

* * * * *